United States Patent [19]

Sugie et al.

[11] Patent Number: 4,530,864

[45] Date of Patent: Jul. 23, 1985

[54] POROUS CERAMIC STRUCTURE

[75] Inventors: Masuo Sugie, Tokoname; Koji Kurihara, Kariya; Yoshiro Aiba, Anjo; Nobiru Komatsu, Tokai; Haruo Ootuka, Ohbu; Kaoru Nishikido, Aichi, all of Japan

[73] Assignees: Toshiba Ceramics Co., Ltd.; Nippon Steel Corporation, both of Tokyo, Japan

[21] Appl. No.: 645,106

[22] Filed: Aug. 28, 1984

[30] Foreign Application Priority Data

Sep. 2, 1983 [JP] Japan ................................ 58-161469

[51] Int. Cl.³ .......................... B32B 1/00; B32B 3/26; B32B 5/32
[52] U.S. Cl. .................................................... 428/35
[58] Field of Search ...................... 428/35, 188, 304.4, 428/312.6, 312.8, 316.6, 319.1

[56] References Cited

U.S. PATENT DOCUMENTS

| 3,505,158 | 4/1970 | Murray | 428/312.8 |
| 3,919,755 | 11/1975 | Kaneko et al. | 428/312.8 |
| 3,959,541 | 5/1976 | King et al. | 428/316.6 |

FOREIGN PATENT DOCUMENTS 31702 9/1984 Japan .

Primary Examiner—William J. Van Balen
Attorney, Agent, or Firm—Oblon, Fisher, Spivak, McClelland & Maier

[57] ABSTRACT

A porous ceramic structure adapted in a molten metal container in a way such that the structure pierces the wall of the container for introducing a gas thereinto. The structure comprises a main body made of a porous ceramic material and having a recession on the side adjacent to the outer surface of the container and a sub-body made of a porous ceramic material fitted in the recession of the main body. This ceramic structure enables the operator to make timely judgment for its replacement with new one before it breaks down to cause leakage of molten metal from its container.

9 Claims, 9 Drawing Figures

POROUS CERAMIC STRUCTURE

This invention relates to a porous ceramic structure adaptable in the wall of a molten metal container for introducing a gas thereinto.

Hitherto, a trunco-conical porous ceramic structure, such as gas permeable porous brick, has been set at a pertinent location of the wall of a molten metal container for supplying a gas through such porous brick into the molten metal in the container for stirring the molten metal or promoting the floating of impurities existing in the molten metal.

However, porous brick is corroded at its face exposed to the molten metal, and consequently the brick thickness decreases gradually from the side contacting the molten metal container. Further, since heating and cooling operations are repeated in the metal treating process, the temperature distribution in the brick is orientated in the direction perpendicular to the face contacting the molten metal, so that the brick would develop cracks parallel to the face contacting the molten metal. Use of the brick with reduced thickness and cracks might cause leakage of the molten metal in the container.

The following table shows the diameter D ($\phi$ mm) of the brick face contacting the molten metal and the thickness of once used brick from its face contacting the molten metal to the position of occurrence of crack, the measurement being made on several known types of porous brick.

TABLE

| Diameter of working face D ($\phi$mm) | Thickness to the position of occurrence of crack H (mm) |
| --- | --- |
| 30 | 5–10 |
| 50 | 10–25 |
| 70 | 10–40 |
| 100 | 15–50 |
| 130 | 20–60 |
| 180 | 30–80 |

It is seen from the above table that the larger is the diameter of the brick side contacting the molten metal, the greater is the remaining thickness of the brick, and it is also noted that in case the diameter of the brick side contacting the molten metal is in the range of 30 to 180 mm$\phi$, crack occurs when the remaining thickness of the once-used brick is 5 to 80 mm. Thus, this table can serve as a guide for the judgment as to at what degree of thickness reduction the brick should be replaced with new one.

However, the judgment of remaining thickness of porous brick in use has been resorted to the past data such as mentioned above or to the sixth sense of a skilled worker, so that such judgment of remaining thickness of porous brick was subject to an error, resulting in causing leakage of molten metal from the container.

The present invention has been deviced in view of such prior art inexpedience, and it has for its object to provide a ceramic structure which allows correct judgment of the thickness that can prevent leakage of molten metal in a container, more specifically a ceramic structure which enables the operator to make correct judgment on whether such ceramic structure in use needs replacement or not, before leakage of molten metal from its container is caused.

According to this invention, said object can be accomplished by providing a porous ceramic structure designed adaptable in a molten metal container so as to pierce the wall of said container for introducing a gas thereinto, said structure comprising a main body made of a porous ceramic material and having a recession on the side adjacent to the outer surface of said container, and a sub-body made of a porous ceramic material designed to fit in said recession of the main body.

Preferably, said sub-body is made of a porous ceramic material having a greater permeability than the main body.

Preferably, a material impervious to the gas introduced is filled between the outer peripheral side surface said sub-body and the inner peripheral surface of said recession of said main body, that is, the side thereof opposing to the outer peripheral side surface of said sub-body.

Also, a space is preferably provided between the top surface of said sub-body and the side of the recession of said main body adjacent to said top face of the sub-body contacts.

Said main body and sub-body are preferably so constructed as to have such a dimensional relation that the ratio of the diameter R of the main body to the diameter r of the sub-body, at the position of the top surface (the side positioned closer to the inner surface of the container) of the sub-boby fitted in said recession of the main body, is given by:

$$r^2/(R^2-R^2) = \tfrac{1}{4} \text{ to } 1/25.$$

A gas is supplied to the areas of said main body and sub-body on the external surface side of the container preferably at such a rate that the ratio of gas flow rate into the sub-body to gas flow rate into the sub-body will be greater than 1.

Said material impervious to the gas introduced is preferably mortal.

Said main body is preferably made of a high alumina ceramic material.

Said sub-body is preferably made of a ceramic material selected from zircon, silica, magnesia and chrome mineral ceramic material.

This invention is to be described in more details referring to the accompanying drawings, by which the foregoing and other objects, as well as the features of this invention will be made clearer, and in which.

Figure 1:
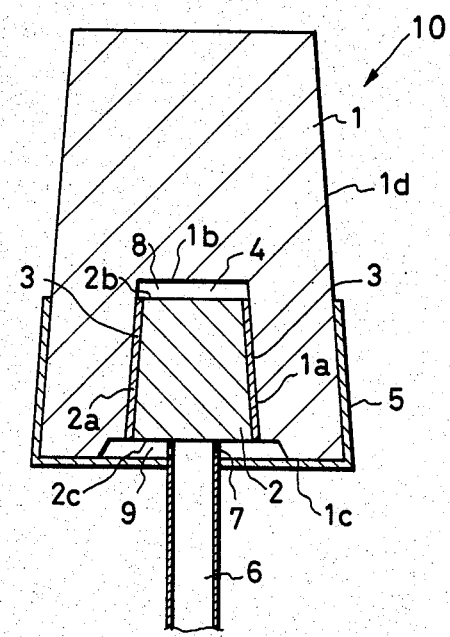
FIG. 1 is a sectional view of a porous ceramic structure in accordance with a preferred embodiment of this invention.

Referring to FIG. 1, there is shown a porous ceramic or brick structure 10 comprising a porous main body 1 having a recession 8 and a porous sub-body 2 fitted in said recession 8. The sub-body 2 is made of a ceramic material having a greater permeability than the main body 1. The sub-body 2 may be made of a ceramic material similar to the main body. Both main body 1 and sub-body 2 are shown as having a truncated conical contour for the facilitation of their adaptation in the wall of a container and fitting (of the sub-body) into the recession 8 of the main body 1, but they may have a columnar configuration. Also, they may be circular in sectional shape. The main body 1 is preferably made of a high alumina ceramic material, but other types of ceramic material can be used. The sub-body 2 is preferably made of a ceramic material selected from zircon, silica, magnesia and chrome mineral ceramic materials, but other ceramic materials for instance, a ceramic material similar to the main body 1 can be used. The space between the external surface 2a of the sub-body 2 and the corresponding inner surface 1a of the recession 8 of the main body 1 is filled with a material impermeable to the gas introduced from a gas supply pipe 6. Mortal is preferred as the gas impermeable material 3, but other materials can be used. A space 4 or a gas pressure equalized zone is provided between the top surface 2b of the sub-body 2 and the corresponding top surface 1b of the recession 8 of the main body 1. The bottom surface 1c and a part of the external surface 1d of the main body 1 are preferably covered with an iron sheet 5. The sheet 5 may be made of other material than iron. The gas supply pipe 6 having a gas outlet opening 7 is provided piercing said sheet 5. Around the gas outlet opening 7 is provided a bottom space 9 designed to distribute the introduced gas into both main body 1 and sub-body 2.

Figure 2:
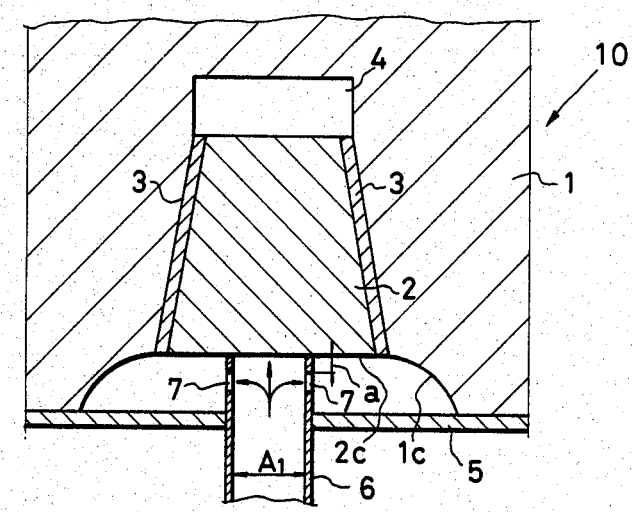
FIG. 2 is an enlarged sectional view of the bottom portion and its vicinity of the porous ceramic structure shown in FIG. 1.

The bottom portion of the porous ceramic structure 10 and its vicinity are shown in detail in FIG. 2. The gas to be introduced into a molten metal is first supplied into the main body 1 and the sub-body 2 after passing the bottom space 9 from the gas outlet opening 7. The gas supplied into the sub-body 2 passes the gas pressure equalized zone 4 and flows in the main body 1 toward the inner side of the molten metal container, while the gas supplied into the main body 1 flows therein toward the inner side of said container, and thus, both portions of gas are finally introduced into the molten metal container.

The flow rate of the gas flowing into the main body 1 and the flow rate of the gas flowing into the sub-body 2 can be controlled by adjusting the size of the gas outlet opening 7. Such control of gas flow rate, which is further discussed later, can be effected by changing the distance a from the bottom surface 2c of the sub-body 2 to the gas outlet opening 7 instead of changing the size of the gas outlet opening 7. Such control can be also made by changing the diameter A1 of the gas supply pipe 6 by fixing the size of the gas outlet opening 7.

Figure 3:
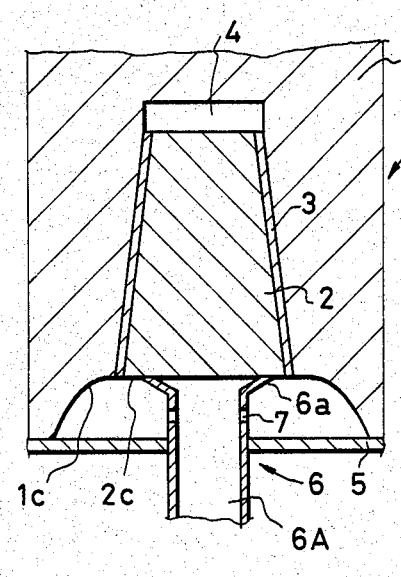
FIG. 3 and FIG. 4 are sectional views of the bottom portion and its vicinity of the porous ceramic structures according to other embodiments of this invention.

In FIG. 3 showing a porous ceramic structure 10a according to another embodiment of this invention, the gas supply pipe 6 has a columnar portion and an end portion 6a spread out diametrally toward the bottom face 2c of the sub-body 2 so that the gas supplied from the gas supply pipe 6 will be effectively supplied into the sub-body 2.

Figure 4:
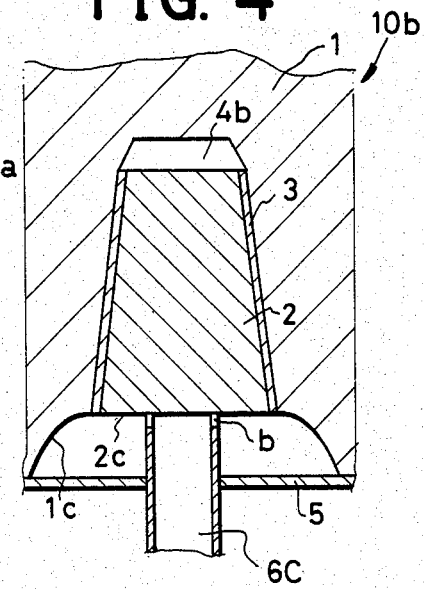

In still another embodiment of porous ceramic structure shown in FIG. 4, the gas supply pipe 6C has no gas outlet opening 7, but in this case, the end of the pipe 6C is disposed at a distance b from the bottom surface 2c of the sub-body 2. The gas flow rate into the main body 1 and the gas flow rate into the sub-body 2 can be adjusted by changing the distance b. The gas pressure equalized zone 4b is reduced in diameter toward the inner side of the molten metal container so that the gas supplied into the sub-body 2 will flow upwardly thereof.

The porous ceramic structure according to this invention enables the operator to make a positive judgment for the timely replacement of the ceramic structure before leakage of molten metal from its container is caused. How the judgment is made will be described below by taking up the case of a preferred example of porous ceramic structure of this invention with particular reference to FIGS. 5 to 7.

During the treatment of molten metal, the porous ceramic structure 10 is heated red-hot by the molten metal. When a gas is supplied from the gas supply pipe 6 after the molten metal has been discharged from its container, the sub-body 2 having a greater permeability than the main body 1 is cooled faster than the main body. The porous ceramic structure 10 is corroded progressively from its side contacting the molten metal, and under this situation, if the operator observes the structure 10 from its overlooking position when the top surface 2b of the sub-body 2 has come to be exposed to the inner surface of the molten metal container, he can plainly distinguish between the sub-body 2 which has assumed a black color after having been cooled by the gas passing at a higher rate than through the main body because of a greater permeability and the red-colored main body 1 which is maintained at a higher temperature than the sub-body 2 because a space is provided between an upper surface of the sub-body 2 and a surface facing to the upper surface of the sub-body 4 in the recession 8 of the main body 1 and because of a smaller permeability. Thus, if the height of the sub-body 2 is set to a limit height that does not allow leakage of molten metal from its container, the change of hue seen at the time of observation of the ceramic structure 10 from its overlooking position can serve as a standard for judgment as to whether the structure 10 should be replaced or not.

The detection of such change of hue can be made even more positive by further incorporating the following conditions (a) to (c), and even in case the main body 1 still remains above the sub-body 2, it becomes possible to detect said change of hue.

(a) Introduction of a gas-impervious material 3 between the main body 1 and sub-body 2

In order to effectively produce a temperature difference between the main body 1 and the sub-body 2 which are cooled by the gas supplied from the gas supply pipe 6, it is desirable that the gas be inhibited from flowing from the external side face 2a of the sub-body 2 toward the opposing internal side face 1a of the main body 1. For this purpose, a gas-impervious material 3 such as mortar is filled between the external side face 2a of the sub-body 2 and the opposing internal side face 1a of the main body 1. Due to this gas-impervious filler 3, the gas introduced into the sub-body 2 is inhibited from flowing out toward the internal face 1a of the main body 1 but is caused to flow toward the top face 2b from the bottom 2c of the sub-body, thus facilitating the generation of a temperature difference between the main body 1 and sub-body 2.

(b) Main body to sub-body ratio of sectional area and distribution of the supplied gas to the main body 1 and sub-body 2

Figure 5:
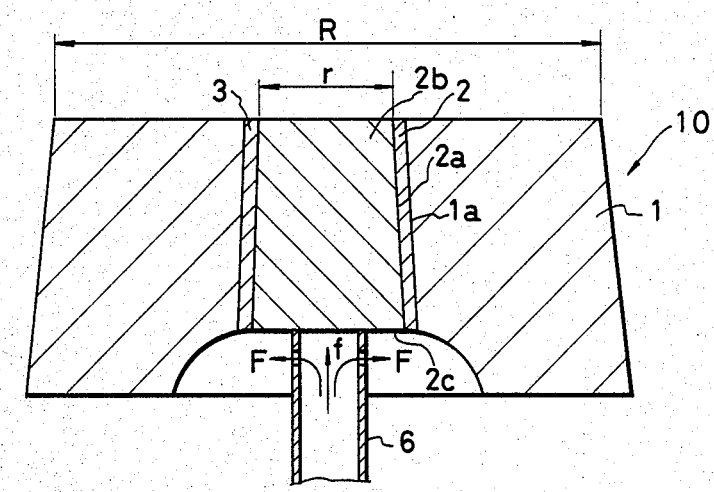
FIG. 5 is an illustrative sectional view of a porous ceramic structure shown as a model for examining the influence of the parameter for detecting the change of hue for determining the time of replacement of the ceramic structure when it was adapted in a molten metal container.

Several porous ceramic structures 10 were prepared by fitting the sub-bodies 2 having the outer diameter (r) varying from 10 mmϕ to 140 mmϕ in a main body 1 having an outer diameter (R) of 150 mm and an inner diameter that allows proper fitting of the sub-body 2 therein, as shown in FIG. 5, and these structures 10 were adapted with the respective gas supply pipes 6 having gas outlet openings 7 varying in size of opening so that the ratio of the gas flow rate (f) into the sub-body 2 to the gas flow rate (F) into the main body 1 (f/F) will be changed. Each of these ceramic structures 10 was placed in a furnace so that the structure 10 would be heated and a gas would be supplied from the gas supply pipe. The furnace was heated to 1,300° C. so that the porous ceramic structure 10 therein would be heated red-hot, then the furnace heating was stopped and a gas was introduced from the gas supply pipe 6, and the change of hue of both main body 1 and sub-body 2 was observed at a position 3 m distant from the top surface of the porous ceramic structure 10.

Figure 6:
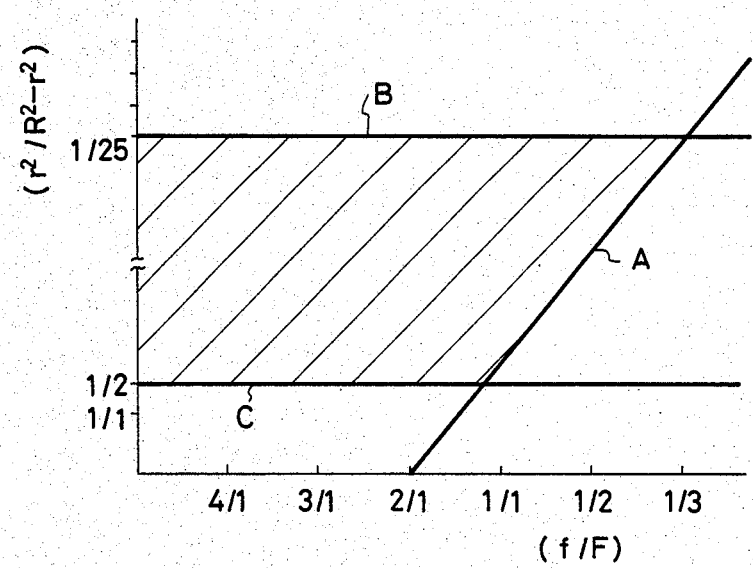
FIG. 6 is a graphic illustration of the relation between the main body to sub-body ratio of sectional area and the ratio of gas flow rate into main body to gas flow rate into sub-body in the porous ceramic structure of FIG. 3 whereby the change of hue can be detected.

FIG. 6 is a graph in which the ratio of the sectional area of the sub-body 2 to the difference between the sectional area of the main body 1 and that of the sub-body 2, that is, $r^2/(R^2-r^2)$ is plotted as ordinate and the ratio of gas flow rate (f) into the sub-body 2 to gas flow rate (F) into the main body 1 is plotted as abscissa, and the region in which the change of hue of both main body 1 and sub-body 2 can be recognized is shown by the shaded area defined by the lines A, B and C. As seen from the graph, if $r^2/(R^2-r^2)$ is less than 1/25, the sub-body body 2 is too small to allow a clear observation of the change of hue of the sub-body 2. On the other hand, in case $r^2/(R^2-r^2)$ is greater than ½, it is also impossible to observe the difference in color hue between main body 1 and sub-body 2 because the main body 1 is also cooled up before the sub-body 2 is cooled and tinted in black, due to small heat conductivity of ceramic. Thus, the main body to sub-body ratio of sectional area at the top face 2b of the sub-body 2 should preferably be so selected that $r^2/(R^2-r^2)$ will be in the range of ½ to 1/25.

As regards the gas flow rate, if the gas flow rate f to the sub-body 2 is smaller than the gas flow rate F to the main body 1, that is, if f/F is less than 1/1, the effect of cooling the sub-body 2 with the gas so quickly as to enable recognition of the change of hue of both main body 1 and sub-body 2 is diminished. In this case, however, if $r^2/(R^2-r^2)$ is reduced, as indicated by line A in FIG. 6, it becomes possible to recognize the change of hue of both main body 1 and sub-body 2 even if f/F is smaller than 1.

The above relation was not affected by the difference in heat conductivity between the material used for the main body 1 and the material used for the sub-body 2. For instance, when a high alumina ceramic material was used for the main body 1, the judgment of hue could be easily made even when using zircon or silica with low heat conductivity or magnesia or chrome mineral ceramic material with high heat conductivity for the sub-body 2.

(c) Formation of gas pressure equalized zone

Figure 7:
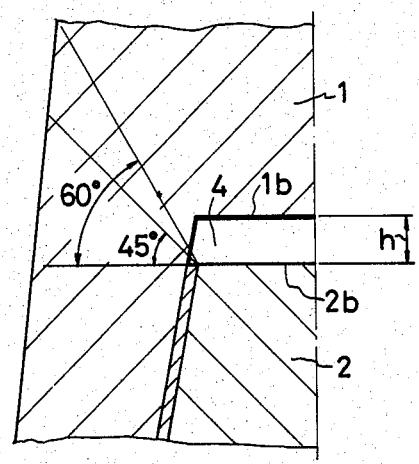
FIG. 7 is a diagram for illustrating the effect of the gas pressure equalized region.

The effect of the space or pressure equalized zone 4 between the top face 2b of the sub-body 2 and the inside surface 1b of the recession 8 of the main body 1, where the gas supplied into and passing the sub-body 2 stays temporarily and is equalized in pressure, will be described with reference to FIG. 7. In case there exists no such pressure equalized zone 4, that is, when h=0, the gas which has reached the top face 2b of the sub-body 2 is diffused into the main body 1 over an angular range of 0° to 45° at the respective points on said face 2b. On the other hand, if said gas pressure equalized zone 4 exists even if small in area, that is, when h>0, the gas which has reached the top face 2b of the sub-body 2 is immediately diffused into said gas pressure equalized zone 4 and accordingly the gas is diffused over a wider angular range (more than 60°) than when no such pressure equalized zone exists. Thus, a greater amount of gas is supplied to the portion of the main body 1 above the sub-body 2 and such portion is cooled faster than other portion when said gas pressure equalized zone 4 exists than when no such zone exists. Accordingly, a temperature difference of such a degree as will allow recognition of the change of hue is produced between the portion of the main body 1 above the sub-body 2 and other portion even if the sub-body 2 is not exposed to the inner surface of the molten metal container. If the ratio of gas flow rate into the main body 1 to gas flow rate into the sub-body 2 is properly selected, the gas reaching the top face 2b of the sub-body 2 is diffused upwards almost vertically, allowing easier observation of the change of hue. The larger the thickness of the gas pressure equalized zone 4, the greater is the above-said effect, but in view of the strength of the porous ceramic structure, it is desirable that the thickness of said zone 4 is not greater than 10 mm. In the structures 10 having a gas pressure equalized zone 4 with a thickness below 10 mm, it was possible to observe the change of hue even when the main body 1 retained a 30–60 mm thick portion above the top face 2b of the sub-body 2. The structure 10 in which the main body 1 retains a 30–60 mm thick portion above the sub-body can still stand 2 to 5 more rounds of use, so that such structure has no fear of causing leakage of molten metal from its container.

Figure 8:
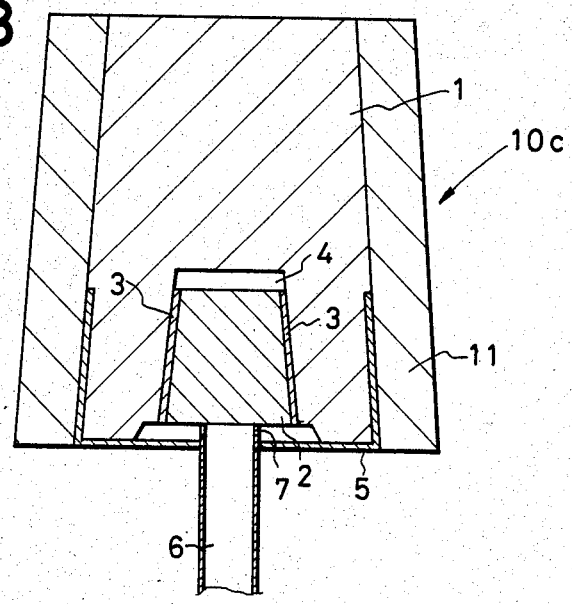
FIG. 8 is a sectional illustration of still another embodiment of this invention.

In a porous ceramic structure 10c according to another embodiment of this invention, the outside of the main body 1 is covered with a gas-impervious refractory 11 as shown in FIG. 8.

As for the location of mounting of the porous ceramic structure 10c in a molten metal container, the structure can be set not only at the bottom of the container but also in a side thereof.

Figure 9:
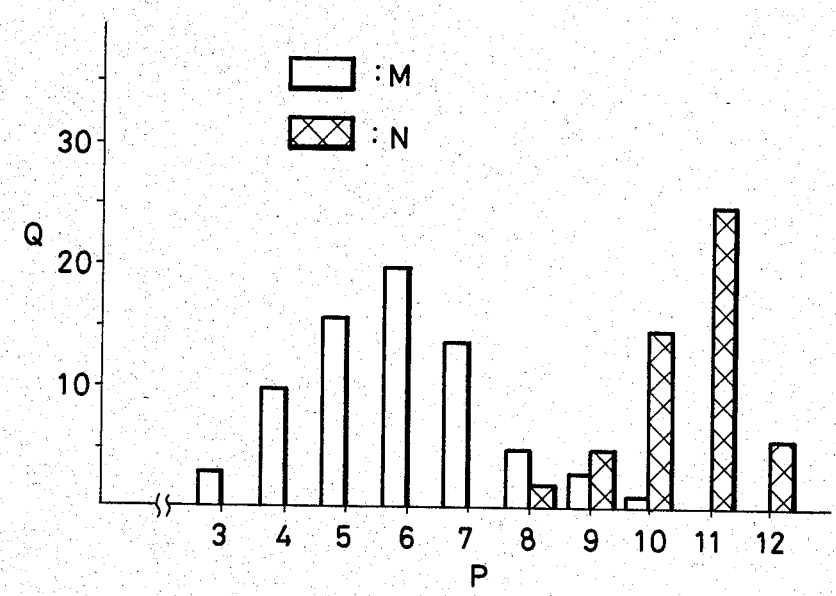
FIG. 9 is a graph showing the results of the tests conducted on a conventional porous ceramic structure and a porous ceramic structure accoridng to this invention.

An actual service test was conducted on a porous ceramic structure (N) according to a preferred embodiment of this invention and a conventional porous ceramic structure (M) by setting them in a 250-ton ladle. The results are shown in the graph of FIG. 9 where the number on the abscissa indicates the number of times of use that the structure could stand (P) (times/structure) and the number on the ordinate indicates the number of the structures subjected to the test (Q). As seen from FIG. 9, the average number of times of use that the conventional porous ceramic structures (M) could stand is 3 to 10 times/structure, that is to say, the service life of such conventional porous ceramic structures is short and also scatters widely, so that such conventional structures must be replaced frequently for the safety of operation. On the other hand, the porous ceramic structure (N) according to this invention can stand a greater number of times of use and shows less scatter in the maximum number of times of use than said conventional porous ceramic structure (M).

Further, the porous ceramic structure of this invention can be utilized not only in a steel-making ladle as described above but also for the judgment of thickness of the bottom blowing tuyere for complex blow smelting in a converter and other refractories used at a temperature above 700° C. and having a gas blowing function.

As described above in detail, according to the porous ceramic structure of this invention, it is possible to easily determine the remaining thickness of the structure before it reaches the marginal lifetime, allowing prevention of leakage of molten metal from its container due to breakdown of the structure.

What is claimed is:

1. A porous ceramic structure adapted in a molten metal container in a way such that said structure pierces the wall of said container for introducing a gas thereinto, said structure comprising:
   a main body made of a porous ceramic material and having a recession on the side positioned adjacent to the external surface of said container; and
   a sub-body made of a porous ceramic material fitted in said recession of said main body.

2. A porous ceramic structure according to claim 1, wherein a space is provided between the top face of said sub-body and the face of the recession of said main body on the side adjoining to said top face of the sub-body.

3. A porous ceramic structure according to claim 1 or 2, wherein the ratio of the diameter R of main body to the diameter r of sub-body at the level of the top face of the sub-body fitted in said recession of the main body is selected such that $r^2/(R^2-r^2)$ is in the range of $\frac{1}{2}$ to 1/25.

4. A porous ceramic structure according to claim 1, wherein said sub-body is made of a porous ceramic material with greater permeability than said main body.

5. A porous ceramic structure according to claim 1, wherein a material impervious to the gas introduced is filled in the space between the outer peripheral side surface of said sub-body and the inner peripheral surface of the recession of said main body on the side adjoining to said outer peripheral side surface of the sub-body.

6. A porous ceramic structure according to claim 1, wherein a gas is supplied into the sides of said main body and sub-body adjacent to the outer surface of said container so that the ratio of gas flow rate into the sub-body to gas flow rate into the main body is greater than 1.

7. A porous ceramic structure according to claim 5, wherein said gas-impervious material is mortar.

8. A porous ceramic structure according the claim 1, wherein said main body is made of a high alumina ceramic material.

9. A porous ceramic structure according to claim 1, wherein said sub-body is made of a ceramic material selected from zircon, silica, magnesia and chrome mineral ceramic material.

* * * * *